United States Patent [19]

Oetiker

[11] Patent Number: 4,998,326
[45] Date of Patent: Mar. 12, 1991

[54] BALANCED CLAMP STRUCTURE

[75] Inventor: Hans Oetiker, Horgen, Switzerland

[73] Assignee: Hans Oetiker AG Maschioen- und Apparatefabrik, Horgen, Switzerland

[21] Appl. No.: 446,700

[22] Filed: Dec. 6, 1989

[51] Int. Cl.⁵ .............................................. B65D 63/00
[52] U.S. Cl. .................................... 24/20 R; 24/20 CW
[58] Field of Search ............ 24/20 R, 20 CW, 20 EE, 24/23 EE

[56]  References Cited

U.S. PATENT DOCUMENTS

| | | | |
|---|---|---|---|
| 1,705,895 | 3/1929 | Blair | 24/20 CW |
| 2,614,304 | 10/1952 | Oetiker | 24/20 CW |
| 3,106,757 | 10/1963 | Thurston et al. | 24/20 CW |
| 3,475,793 | 11/1969 | Oetiker | 24/20 CW |
| 3,789,463 | 2/1974 | Oetiker | 24/20 CW |
| 3,869,944 | 3/1975 | Oetiker | 24/20 CW |
| 4,299,012 | 11/1981 | Oetiker | 24/20 CW |
| 4,315,348 | 2/1982 | Oetiker | 24/20 CW |
| 4,402,113 | 9/1983 | Smith | 24/20 R |
| 4,430,775 | 2/1984 | Arthur | 24/20 CW |

Primary Examiner—Victor N. Sakran
Attorney, Agent, or Firm—Paul M. Craig, Jr.

[57]  ABSTRACT

A clamp structure of the open type with mutually overlapping inner and outer band portions, in which two ears are provided disposed diametrically opposite one another and at least the outer band portion is provided with an additional opening on the side of its ear opposite the free end of the outer band portion to balance the clamp structure when installed on an object to be fastened thereby. For larger clamp sizes, the inner band portion may also be provided with an opening located on the side of the outwardly extending hooks of the mechanical interconnection opposite the free end of the inner band portion. The inner band portion may additionally be provided with an outwardly extending hook adapted to engage in the opening provided in the outer band portion so as to keep the two band portions axially aligned. Elastic stretchability may be imparted to the clamping band by one more sections having non-rectilinear lateral band portions on both sides of the center longitudinal clamping band plane, whereby one or more of such sections replace one or more of the openings.

43 Claims, 3 Drawing Sheets

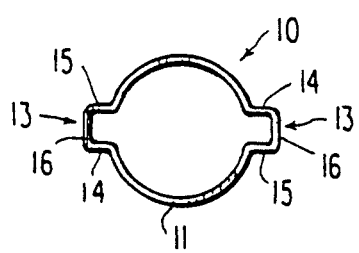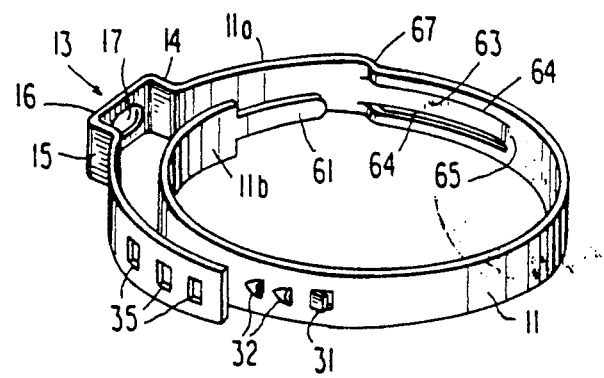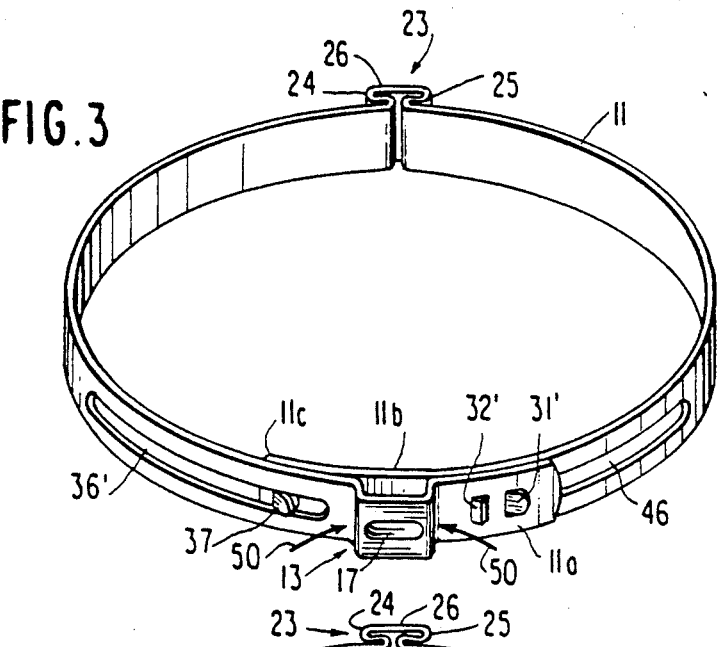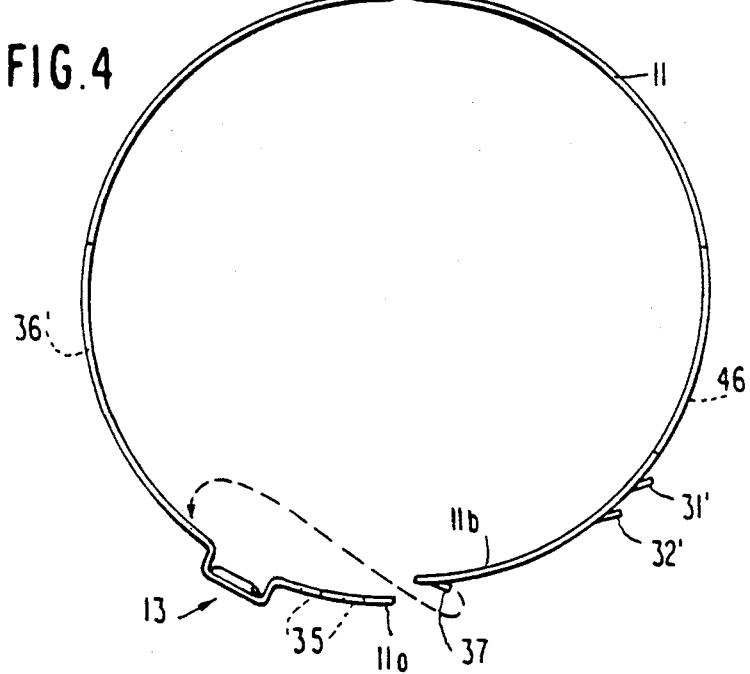

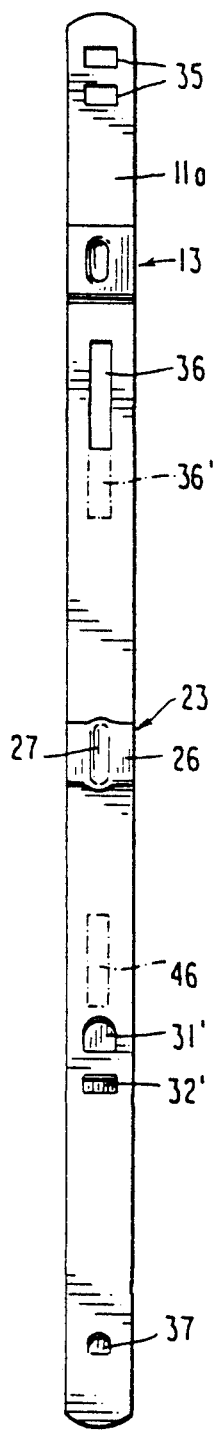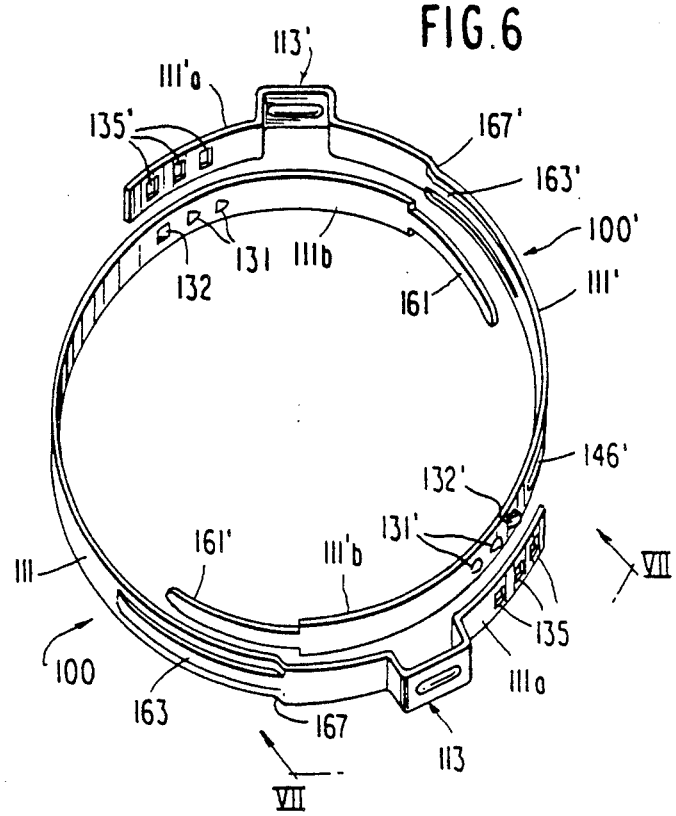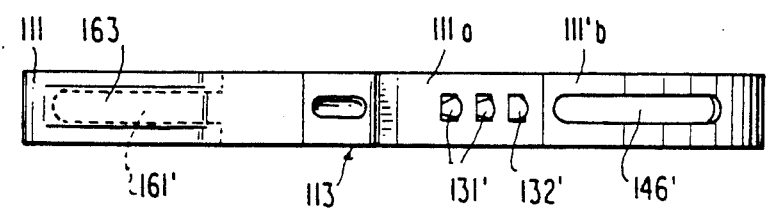

BALANCED CLAMP STRUCTURE

FIELD OF THE INVENTION

The present invention relates to a clamp structure, and more particularly to a balanced clamp structure which can be used on rotating parts.

BACKGROUND OF THE INVENTION

Clamps of the most varied types equipped with one or more so-called "Oetiker" ears have been sold with immense success worldwide for more than thirty years. These clamps are either of the endless type, made from tubular stock, or are of the open type in which case the overlapping ends are mechanically interconnected. For reasons of economy and ease of installation, one-ear clamps are preferred in normal applications because such one-ear clamps require only the closing of one ear for purposes of tightening the clamp about an object to be fastened. However, clamp structures with two or more ears are also available, for example, for applications where dimensional conditions and/or desired tightening forces make the use of more than one ear preferable.

While the one-ear clamps pose no problems in stationary or quasi-stationary applications, the imbalance resulting therefrom raises some problems with rotating parts, especially parts subjected also to relatively higher rotational speeds. This problem is exacerbated if the clamps are used in applications where they are intended to fasten tubular members to protect the lubricant of bearings, as, for example, in connection with axle boots in front-wheel drive motor vehicles. Furthermore, the problem is aggravated if the used clamps are of the so-called stepless type as disclosed, for example, in my U.S. Pat. No. 4,299,012 in which a relatively long area of circumferential overlap of the inner and outer band portions exist in the area of the ear which increases the imbalance. However, such stepless clamps are required in applications such as axle boots made from relatively thin hard plastic material, such as "Hytrell" material.

OBJECT OF THE INVENTION

It is the principal object of the present invention to provide a clamp structure which can be used also with rotating parts, and more particularly to provide also a balanced stepless clamp structures.

SUMMARY OF THE INVENTION

The underlying problems are solved according to the present invention in that, in addition to the normal single "Oetiker" ear provided within the area of overlap of an open clamp structure, a second such ear is provided diametrically opposite to the first ear which is of the same dimensions as the first ear. The second ear is thereby preferably already deformed during manufacture of the flat blank for the clamp so as to assure correct deformation of the second ear. This also obviates the need for an extra closing operation at the place of use of the clamp structure and additionally assures uniformity in the plastic deformation of the second ear. However, the addition of a second ear does not necessarily permit complete elimination of any unbalance in open clamp structures, in which the overlap of the inner and outer band portions causes more material to be present within the area of the overlap. According to the present invention, the remaining imbalance can be readily eliminated in a surprisingly simple manner by providing one or more openings in the band portion within the area or areas of the overlap. In case of so-called stepless clamps of the type described in my prior U.S. Pat. No. 4,299,012, the opening or openings are provided within areas adjacent the plastically deformable first ear provided for tightening purposes.

According to another feature of the present invention, the clamping band is provided with one or more sections which impart elastic stretchability to the otherwise normally non-stretchable band material, made, for example, from galvanized or stainless steel. This features is important because it minimizes the danger of a reopening of the already previously closed second ear to assure optimum holdability, when the first ear is closed by plastic deformation to tighten the clamp structure about the object to be fastened thereby. Furthermore, the first ear can now also be closed fully to maximize its holding ability without regard to the closing forces exerted by the pincers because any excessive closing force can be compensated by elastic stretching of the clamping band. The use of pneumatic pincers operating with predetermined pressure is obviated thereby. Additionally, the use of a clamping band having elastic stretchability in its longitudinal direction eliminates pre-existing limitations on the design of the ear, for instance, with respect to height of the ear and length of the bridging member and allows greater freedom in the plastically deformed configuration of the ear to maximize its holding ability.

The desirability of a permanently available spring force in a clamping band had been recognized already in my prior U.S. Pat. No. 3,475,793 in which one or several distributed tensional spring elements were provided in the band. However, apart from cost considerations, these spring elements did not impart elastic stretchability to the band itself.

Furthermore, a clamping band is disclosed in French Patent Publication 2 480 875 in which an elasticity reserve is intended to be achieved by forming one or more zig-zag-shaped narrow band or wire sections of triangular, sinusoidal, trapezoidal or rectangular configuration as seen in plan view. However, this prior art arrangement entails certain disadvantages compared to the present invention, in which lateral non-rectilinear band portions are provided on both sides of the center longitudinal plane of the band to assure substantially uniform, controlled elastic stretching regardless of the number of sections which are utilized in a given clamp structure.

In its broadest aspects, this invention is applicable to any open clamp structure in which the open ends are mechanically interconnected and the inner band portion is overlapped by the outer band portion, especially also in those clamp structures where the inner band portion extends underneath the open ear to prevent hose material from being squeezed into the gap underneath the ear.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 axial view of a prior art endless two-ear clamp structure;

FIG. 2 is a perspective view of a prior art open one-ear stepless clamp structure;

FIG. 3 is a perspective view of a larger-size balanced clamp structure in accordance with the present invention with the parts shown in their position when the overlapping ends have been mechanically connected;

FIG. 4 is an axial view on the clamp structure of FIG. 3, showing structure in the still open position;

FIG. 5 is a plan view on the flat blank of a clamp structure similar to FIG. 3 but of smaller size;

FIG. 6 is a perspective view of a clamp structure made of two of unequal size;

FIG. 7 is a plan view on the part of the clamp structure of FIG. 6 within the area indicated by arrows VII—VII in FIG. 6;

DETAILED DESCRIPTION OF THE DRAWINGS

Figure 8:
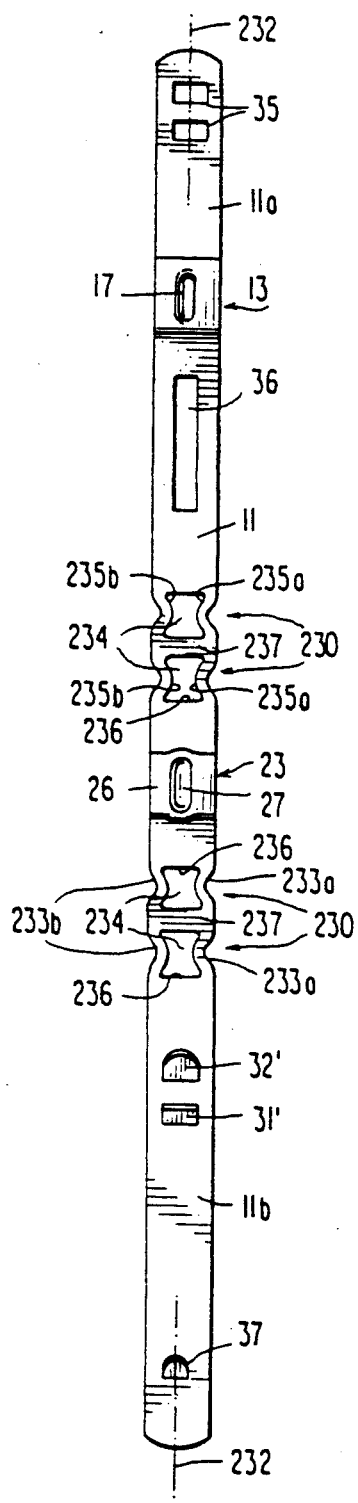
FIG. 8 a plan view on a flat blank of a modified embodiment of a balanced clamp structure, similar to FIG. 5 but provided with a band section imparting elastic stretchability to the clamping band to the present invention.

Referring now to the drawing wherein like reference numerals are used throughout the various views to designate like parts, and more particularly to FIG. 1, this figure shows a clamp structure generally designated by reference numeral 10 consisting of a clamping band 11 and two mutually oppositely disposed so-called "Oetiker" ears generally designated by reference numeral 13 which consist of two leg portions 14 and 15 interconnected by a bridging portion 16 as disclosed in my prior U.S. Pat. No. 2,614,304. The two-ear clamp structure of FIG. 1 is made from endless tubular stock and for all practical purposes does not involve any problems of imbalance because of the presence of two ears 13 which can be accurately located mutually opposite one another in the course of manufacture when the ring cut from tubular stock is deformed into the two-ear clamp. Though the endless two-ear clamp of FIG. 1 has experienced immense commercial success, numerous applications prefer or require open clamps which are mechanically interconnected only after the clamp structure is placed about the object to be fastened, for example, by the engagement of outwardly extending hooks in the inner band portion engaging in apertures provided in the overlapping outer band portion.

FIG. 2 illustrates an open single-ear clamp structure of the so-called stepless type as disclosed in my prior U.S. Pat. No. 4,299,012. This clamp structure again includes a clamping band 11 as well as a so-called "Oetiker" ear generally designated by reference numeral 13 and again consisting of two leg portions 14 and 15 interconnected by a bridging portion 16 provided with a reinforcing groove 17. Outwardly extending hooks 31 and 32 in the inner band portion 11b are adapted to engage in apertures 35 provided in the outer band portion 11a. These hooks may be, for example, a guide hook 31 and two cold-deformed support hooks 32 as more fully disclosed in my prior U.S. Pat. No. 4,299,012. To achieve steplessness, the inner band portion 11b is provided with a tongue-like extension 61 adapted to engage in a central channel 63 which is formed by pressing out the corresponding central part after cuts 64 are made. The channel 63 thereby extends from a step 67 in the direction away from the free end of the outer band portion 11a toward a second step-like configuration 65, leaving lateral band portions for engagement with the object to be fastened. When a clamp structure of the type shown in FIG. 2 is installed about an object to be fastened, an imbalance exists due to the presence of the single ear 13 and the extra weight caused by the overlap within the area of the ear 13 by the overlap of the inner and outer band portions 11b and 11a which can be eliminated by the present invention, as will be explained more fully hereinafter by reference to FIG. 3.

FIGS. 3 and 4 illustrate an open clamp structure similar to FIG. 2 in which, differing from FIG. 2, the overlapping inner and outer band portions 11b and 11a of the clamping band 11 form a step 11c (FIG. 3) corresponding to the thickness of the free end of the inner band portion 11b. Additionally, the guide hook 31' is a tab-like member bent out after an approximately semicircular cut while the hook 32' is bent out after a shallow U-shaped cut, i.e., a U-shaped cut whose legs in the longitudinal direction of the clamping band are relatively short. Like the clamp structure of FIG. 2, the clamp structure according to FIGS. 3 and 4 has an imbalance in its installed condition due to the presence of the ear 13 and the extra weight caused by the overlap of the inner and outer band portions 11b and 11a within the area of the ear 13.

To obviate the problems of unbalance, a clamp structure in accordance with the present invention includes a second ear generally designated by reference numeral 23 (FIGS. 3 and 4) which, in its non-plastically deformed condition, is similar to ear 13 and again includes two leg portions interconnected by a bridging portion provided with a reinforcing groove. The ear 23 is thereby located in the flat blank of the clamping band 11 in a position which corresponds to the location diametrically opposite the ear 13 when the band is bent into its final shape and installed on the object to be fastened thereby. In a preferred embodiment according to the present invention, the second ear 23 is plastically deformed at its place of manufacture and is pressed flat at that time by the application of a radially inwardly directed force on the bridging portion resulting in a shape as shown in FIGS. 3-5. Differing from the usual omega shape of a plastically deformed "Oetiker" ear obtained by the application of pincers, schematically indicated in FIG. 3 by arrows 50, the plastically deformed ear 23 of FIGS. 3-5 has a flat top portion 26 forming part of two relatively flat, oppositely directed lobes 24 and 25 to maximize shape retention of the deformed ear. Additionally, the reinforcing groove 27 (FIG. 5) is also lengthened to extend substantially over the entire length of the flat top portion 26 to thereby further increase the ability of ear 23 to retain its thus-deformed shape. The flattening of ear 23 with its lengthened reinforcing groove 27 can thereby take place after the ear 23 is initially plastically deformed in the usual manner by the application of a pincer-like tool, or preferably all deformations take place in the course of the same operation, preferably already at the place of manufacture of the clamp structure.

To eliminate the remaining imbalance in the installed clamp structure caused by the overlap of the inner and outer band portions 11b and 11a, a rectangular opening is provided in the outer band portion on the side of the ear 13 opposite the free end of the outer band portion 11a. The opening of a relatively shorter length, as used for smaller clamp sizes, is designated by reference numeral 36 in FIG. 5 and a similar opening of greater length, as used for larger clamp sizes, is designated in FIGS. 3 and 4 by reference numeral 36', and is also shown in FIG. 5 in dash and dotted lines 36'. The inner band portion 11b may also be provided with an outwardly extending hook 37 of such size as to be able to extend through the opening 36, respectively, 36' to hold the inner and outer band portions 11b and 11a in axially aligned position. The outwardly extending hook 37 is thereby so located in the inner band portion 11b near its free end that it will be located within the area of the opening 36, respectively, 36' nearer the ear 13 so that it is able to move within the opening 36, respectively, 36' in a direction away from the ear 13 as the latter is closed to tighten the clamp structure. The size and configuration of the opening 36 or 36' can be readily determined empirically and can be varied for any given clamp size and material of the clamping band.

While a single relatively short opening 36 is sufficient for smaller clamp sizes (FIG. 5), it is desirable for larger clamp sizes, as shown in FIGS. 3 and 4, to increase the length of the opening 36', as indicated in dash and dotted lines 36' in FIG. 5. In addition to the opening 36' provided in the outer band portion 11a, a second opening 46 is provided therefore in the inner band portion 11b on the side of the outwardly extending hooks 31' and 32' opposite the free end of the inner band portion 11b. In the embodiment of FIGS. 3 and 4, the elongated openings 36' and 46 have rounded-off, semi-circularly shaped ends whereby the length of the opening 46 in the circumferential direction of the clamp structure is less than that of the opening 36'. The relative sizes as well as the location and absolute lengths of the openings can again be readily determined empirically.

The present invention can be readily applied to the stepless clamp structure of FIG. 2 by providing in the outer band portion 11a of the clamping band 11 a second ear, similar to ear 23 of FIGS. 3-5, which is located diametrically opposite to the ear 11. Additionally, an opening similar to opening 36 or 36' is then provided in the outer band portion 11a of the clamping band 11 of FIG. 2 intermediate the step 67 and the ear 13. If necessary, a second opening, similar to opening 46 of FIGS. 3-5, may also be provided in the inner band portion 11b which is preferably located again on the side of hook 31 opposite the free end of the inner band portion 11b.

The clamp structure of FIG. 2, thus modified in accordance with the present invention, would exhibit a small gap or discontinuity within the area of the second ear 23 which can be minimized by the deformation of the second ear 23 to bring the transitions from the clamping band 11 into the lobes 24 and 25 of the second ear as close together as possible. Furthermore, the resulting gap may also be bridged by a bridging member, for example, as disclosed in my prior U.S. Pat. No. 3,789,463 which is so constructed that it can be made of relatively thin band material to minimize the step produced thereby.

If an open clamp structure of the type shown in FIG. 2 is desired, which is both stepless and fully balanced, this can be achieved by the use of two identical standard parts of the same length and each of a type shown in FIGS. 6 and 7. FIGS. 6 and 7 thereby also illustrate the present invention applied to a size of clamp structure requiring, in lieu of two identical standard parts, two standard parts of different length.

The two standard parts of different lengths are generally designated in FIGS. 6 and 7 by reference numerals 100 and 100', each including a clamping band 111 and 111'. Each clamping band 111 and 111' is provided, starting from its free end intended to form an outer band portion 111a and 111'a, with apertures 135 and 135', with an ear 113 and 113', with a step 167 and 167' and with a pressed-out tongue-receiving channel 163 and 163'. Starting from its free end intended to form an inner overlapped band portion 111b and 111'b, each clamping band 111 and 111' is provided with a tongue-like extension 161 and 161' adapted to engage in the tongue-receiving channel 163 and 163' and with outwardly extending hooks 131, 132 and 131' and 132' adapted to engage in apertures 135' and 135. The standard parts 100 and 100' so far described are similar to the clamp structure of FIG. 2, reference numerals of the 100-series designating parts in FIGS. 6 and 7 similar to those in FIG. 2.

A clamp structure of the open type, which has the stepless feature of the clamp structure of FIG. 2 and which is balanced, can be obtained in a simple manner by the use of either two or more identical parts or two or more similar standard parts 100 or 100' assembled in the manner indicated in FIG. 6. This permits the realization of a relatively large number of clamp sizes by the use of a relatively small number of standard parts. The presence of two or more "Oetiker" ears in a given clamp structure which can be closed more or less depending on the external dimensions of a hose, increases the range of diametric dimensions which can be covered by such a clamp structure.

However, in order to keep the number of standard parts of different length as small as possible, on the one hand, and to cover as many clamp sizes as possible, on the other, the present invention proposes the use of standard parts of different length and then to eliminate any unbalance resulting therefrom, by the modifications described by reference to FIGS. 3-5.

FIGS. 6 and 7 illustrate the present invention applied to two standard parts 100 and 100' of unequal length and assembled as shown to obtain a balanced stepless clamp structure for a diametric dimension not obtainable otherwise by the use of two identical standard parts. Because of the unequal lengths of the standard parts, the two ears 23 and 23' will not be located exactly diametrically opposite one another. However, by providing an appropriate opening or openings in the inner and/or outer band portions, it is again possible to provide a clamp structure which is properly balanced. One opening 146' provided in the inner band portion 111'b is shown in FIGS. 6 and 7 for purposes of explanation and illustration only of the present invention. However, it is understood that the number of openings, their shape and exact location can be varied in accordance with the present invention, taking into consideration what was explained by reference to FIGS. 2-5.

Figure 9:
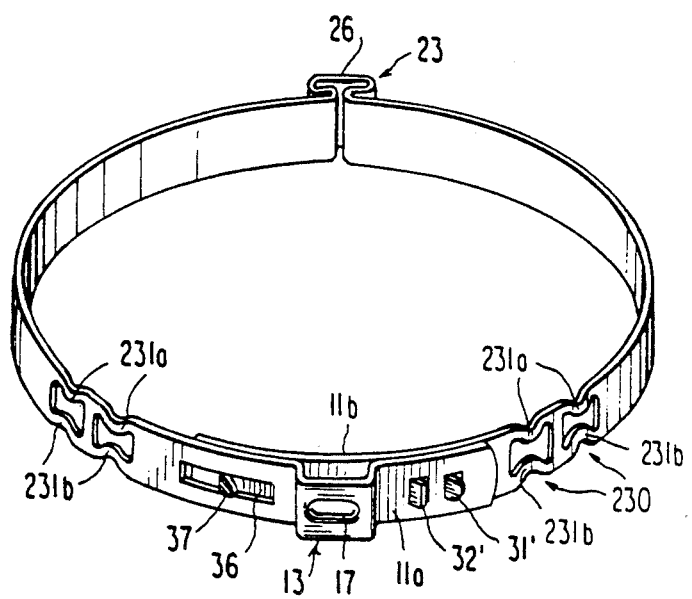
FIG. 9 is a perspective view of the balanced clamp structure with the use of a blank of the type shown in FIG. 8 and illustrating the parts in their position when the overlapping ends have been mechanically connected, similar to FIG. 3.

FIGS. 8 and 9 illustrate modified embodiments of the open clamp structures of FIGS. 5 and 3, respectively, similar parts being designated therein by similar reference numerals. More specifically, FIGS. 8 and 9 differ from FIGS. 5 and 3 by replacing openings 36, respectively, 36' and/or 46 by one or more sections generally designated by reference numeral 230 designed to impart elastic stretchability in the longitudinal band direction to the clamping band 11 normally made from a material devoid of elastic stretchability in the band longitudinal direction, for example, made from galvanized or stainless steel. This is achieved by non-rectilinear lateral band portions 231a and 231b located on both sides of the band center longitudinal plane 232 which are realized by material removal from the normal band. Tensional forces in the clamping band will thereby cause the non-linear lateral band portions 231a and 231b to become less non-linear and cessation of these tensional forces will then cause the lateral band portions 231a and 231b to elastically become more non-rectilinear again provided the yield strength of the material has not been exceeded. The lateral band portions 231a and 231b are preferably arranged substantially symmetrically to the center longitudinal plane 232. In the illustrated embodiments of FIGS. 8 and 9, each section 230 is of substantially symmetrical design with respect to the center longitudinal plane 232, whereby the lateral band portions 231a and 231b are formed in effect by generally segmentally shaped cut-outs leaving concavely curved sides 233a and 233b and by cut-outs 234 in the central areas of the clamping band 11. In FIGS. 8 and 9, the cut-outs 234 are in the shape at least approximately resembling an hourglass. Each lateral band portion 231a and 231b has a width less than 40% the width of the clamping band 11 and preferably less than 35% of the clamping band width. The width of the non-rectilinear band portions 231a and 231b is thereby determined by such factors as the degree of desired spring stiffness, elasticity, holding ability, material of the clamping band and material of the object to be fastened thereby. The lateral band portions 231a and 231b in the embodiments of FIGS. 8 and 9 are of at least approximately constant width, i.e., the external side surfaces 233a and 233b extend at least approximately parallel to the side surfaces 235a and 235b formed by a respective cut-out 234, which converge from each transversely extending end surface 236 thereof toward the narrowest place of the cut-out 234, whereby the end surfaces 236 of adjacent sections 230 define therebetween web portions 237 of normal band width. The transitions between web portions 237 and concavely shaped side surfaces 233a and 233b as well as the corners between end surfaces 236 and side surfaces 235a and 235b are preferably rounded off. By thus imparting elastic stretchability to the clamping band, tensional force changes in the band, for example, caused by temperature changes and/or pressure changes of the medium carried by a hose fastened by the clamp structure, can be compensated by the section(s) 230 so that the ears 13 and 23 can be closed to maximize holding ability without regard to closing pressure for the ear and will remain closed even though this band undergoes changes in length in the circumferential direction of the clamping band. In other words, for example, thermal expansion and contraction of the clamping band will be absorbed in the first instance by the section(s) 230 without affecting the shape of the closed ears, i.e., without causing the gap underneath the ear to widen. In actual tests, an elastic stretchability per section between about 0.4 mm. to about 0.5 mm. was obtained with the configurations of FIGS. 8 and 9 using stainless steel material, whereby an elastic return by that amount was realizable even though a section had been stretched more than that amount. This elasticity was obtained up to an elastic limit (yield strength) of the band material of about 2.3 mm. per section.

The number of sections 230 for a given size of a given clamp structure can be chosen to meet existing design criteria. Furthermore, the opening 36 or 36' need not be replaced in its entirety by several sections 230 but may be replaced only partially to retain the guide function of the remaining opening 36 or 36' for pin 37.

Additionally, the design of sections 230 may also be modified as long as the sections provide adequate holding ability of the object to be fastened thereby and a controllable elastic stretching takes place which is substantially uniform for each such section.

While I have shown and described several embodiments in accordance with the present invention, it is understood that the same is not limited thereto but is susceptible of numerous changes and modifications as known to those skilled in the art. Thus, in lieu of a single elongated or rectangular opening 36, 36' or 46, also several openings may be provided appropriately spaced from one another and of any appropriate shape, for example, of elongated, oval or circular shape whereby one or more of these openings can be replaced by one or more sections 230. Furthermore, the type of mechanical connection used may be different from those shown herein and may be of any known type. Moreover, elastic stretch-imparting sections may also be used with the embodiments of FIGS. 6 and 7.

I therefore do not wish to be limited to the details shown and described herein but intend to cover all such changes and modifications as known to those skilled in the art and as covered by the appended claims.

I claim:

1. A clamp structure of the open type for use on rotating parts, comprising clamping band means adapted to provide overlapping band portions in the installed condition of the clamp structure about an object to be fastened thereby, mechanical connecting means for mechanically connecting overlapping band portions including outwardly extending hook means in an inner band portion operable to engage in aperture means provided in an overlapping outer band portion, two ear means in said clamping band means which are located at least approximately diametrically opposite one another, at least one of said ear means being plastically deformable for tightening the clamp structure about the object to be fastened thereby after engagement of the outwardly extending hook means in the aperture means, and further means including an opening in at least the outer band portion to compensate for imbalances in the clamp structure.

2. A clamp structure according to claim 1, wherein the opening in the outer band portion is located on the side of the plastically deformable ear means opposite the free end of the corresponding outer band portion.

3. A clamp structure according to claim 2, wherein the inner band portion includes an outwardly extending hook near its free end of such shape as to guidingly engage in said opening.

4. A clamp structure according to claim 2, further comprising means providing a stepless configuration in the inner surfaces of the clamping band means including a tongue-like extension at the free end of the inner band portion and a tongue-receiving means in the outer band portion commencing from a step on the side of the one ear means opposite the free end of the outer band portion and extending from said step in a direction away from the one ear means, characterized in that said first-mentioned opening is located within the area between said one ear means and said step.

5. A clamp structure according to claim 3, wherein said clamp structure is made from a unitary clamping band means with the two ear mean located substantially diametrically mutually opposite one another in the clamp structure when the outwardly extending hook means engage in the corresponding aperture means and the one ear means is plastically deformed to tighten the clamp about the object to be fastened thereby.

6. A clamp structure according to claim 5, wherein the ear means located opposite the plastically deformable one ear means is pre-deformed into predetermined shape.

7. A clamp structure according to claim 6, wherein the shape of the pre-deformed ear means includes two lobes extending in mutually opposite circumferential directions with a substantially flat connecting portion constituting the outer part of each oppositely directed lobe.

8. A clamp structure according to claim 7, wherein the pre-deformed ear means has a reinforcing groove extending over nearly the entire length of the substantially flat outer portion.

9. A clamp structure according to claim 8, wherein the pre-deformed ear means is pre-deformed to have transition portions from the clamping band means into each lobe which are closely spaced from one another in the circumferential direction to minimize any gap therebetween.

10. A clamp structure according to claim 9, wherein the further means includes a second opening provided in the inner band portion on the side of the hook means opposite its free end.

11. A clamp structure according to claim 10, wherein each opening is of elongated shape in the circumferential direction of the clamp.

12. A clamp structure according to claim 10, wherein each opening is of rectangular shape.

13. A clamp structure according to claim 10, wherein each opening is of elongated shape having semi-circularly shaped end portions.

14. A clamp structure according to claim 10, wherein several openings are provided each of predetermined shape and exhibiting different configurations.

15. A clamp structure according to claim 1, wherein the inner band portion includes an outwardly extending hook near its free end of such shape as to guidingly engage in said opening.

16. A clamp structure according to claim 1, wherein said clamp structure is made from a unitary clamping band means with the two ear means located diametrically mutually opposite one another in the clamp structure when the outwardly extending hook means engage in the corresponding aperture means and the one ear means is plastically deformed to tighten the clamp about the object to be fastened thereby.

17. A clamp structure according to claim 1, wherein the ear means located opposite the plastically deformable one ear means is pre-deformed into predetermined shape.

18. A clamp structure according to claim 17, wherein the shape of the pre-deformed ear means includes two lobes extending in mutually opposite circumferential directions with a substantially flat connecting portion constituting the outer part of each oppositely directed lobe.

19. A clamp structure according to claim 18, wherein the pre-deformed ear means has a reinforcing groove extending over nearly the entire length of the substantially flat outer portion.

20. A clamp structure according to claim 18, wherein the pre-deformed ear means is pre-deformed to have transition portions from the clamping band means into each lobe which are closely spaced from one another in the circumferential direction to minimize any gap therebetween.

21. A clamp structure according to claim 1, wherein the further means includes a second opening provided in the inner band portion on the side of the hook means opposite its free end.

22. A clamp structure according to claim 1, wherein the clamp structure is made of two standard parts of unequal length each provided with an ear means, and wherein at least one opening forming part of said further means is provided in one of said parts to compensate for any imbalance resulting from the different lengths of the standard parts.

23. A clamp structure according to claim 1, wherein said further means are formed at least in part by at least one section of the clamping band means having non-rectilinear lateral band portions on both sides of the center longitudinal plane of the clamping band means which impart to the clamping band means properties of elastic stretchability, and wherein each section is formed in effect by material removed from the normal clamping band means.

24. A clamp structure according to claim 23, wherein said non-rectilinear band portions are formed by at least one centrally disposed window means in the clamping band means.

25. A clamp structure according to claim 24, wherein a respective window means has a shape at least approximately resembling an hourglass.

26. A clamp structure according to claim 25, wherein the sides of said clamping band means are curved concavely within the area of a respective window means.

27. A clamp structure according to claim 26, wherein each of the two side surfaces of said clamping band means are shaped to follow at least approximately the shape of the adjacent side of the window means.

28. A clamp structure according to claim 27, wherein two of the lateral band portions are formed between a respective side surface and the corresponding adjacent side of the window means, and wherein each of the two lateral band portions is at least of approximately constant width over a substantial part of their length.

29. A clamp structure according to claim 23, characterized in that the further means are substantially symmetrical to the center longitudinal plane of the clamping band means.

30. A clamp structure according to claim 21, further comprising means providing a stepless configuration in the inner surfaces of the clamping band means including a tongue-like extension at the free end of the inner band portion and a tongue-receiving means in the outer band portion commencing from a step on the side of the one ear means opposite the free end of the outer band portion and extending from said step in a direction away from the one ear means, and wherein said first-mentioned opening is located within the area between said one ear means and said step.

31. A clamp structure of the open type for use on rotating parts, comprising clamping band means adapted to provide overlapping band portions in the installed condition of the clamp structure about an object to be fastened thereby, mechanical connecting means for mechanically connecting overlapping band portions, several ear means in said clamping band means which are located at least approximately equispaced in the circumferential direction, at least one of said ear means being plastically deformable for tightening the clamp structure about the object to be fastened thereby, and further means including an opening in at least the outer band portion to compensate for imbalances in the clamp structure.

32. A clamp structure according to claim 31, wherein the opening in the outer band portion is located on the side of the plastically deformable ear means opposite the free end of the corresponding outer band portion.

33. A clamp structure according to claim 31, wherein the inner band portion includes an outwardly extending hook near its free end of such shape as to guidingly engage in said opening.

34. A clamp structure according to claim 31, wherein another ear means is pre-deformed into predetermined shape.

35. A clamp structure according to claim 34, wherein the shape of the pre-deformed ear means includes two lobes extending in mutually opposite circumferential directions with a substantially flat connecting portion constituting the outer part of each oppositely directed lobe.

36. A clamp structure according to claim 35, wherein the pre-deformed ear means has a reinforcing groove extending over nearly the entire length of the substantially flat outer portion.

37. A clamp structure according to claim 31, wherein said further means are formed at least in part by at least one section of the clamping band means having non-rectilinear lateral band portions on both sides which impart to the clamping band means properties of elastic stretchability, and wherein each section is formed in effect by material removal from the normal clamping band means.

38. A clamp structure according to claim 37, wherein said non-rectilinear lateral band portions are formed by at least one centrally disposed window means in the clamping band means, and wherein a respective window means has a shape at least approximately resembling an hourglass.

39. A clamp structure according to claim 31, characterized in that the further means are substantially symmetrical to the center longitudinal plane of the clamping band means.

40. A stepless clamp structure of the open type for use on rotating parts, comprising clamping band means adapted to provide overlapping band portions in the installed condition of the clamp structure about an object to be fastened thereby, mechanical connecting means for mechanically connecting overlapping band portions including outwardly extending hook means in an inner band portion operable to engage in aperture means provided in an overlapping outer band portion, at least two ear means at least approximately symmetrically arranged in said clamping band means when installed about the object to be fastened thereby, said clamp structure being assembled of at least two standard parts each including two clamping band end portions intended to form, respectively, an inner clamping band portion and an outer clamping band portion, each outer clamping band portion being provided with aperture means on the side of its ear means in the direction toward its free end, each inner clamping band portion being provided with hook means for engagement in the aperture means of another standard part, still further means in said clamp structure to assure a stepless internal configuration including a tongue-like extension at the free end of each inner band portion and a tongue-receiving means for receiving the tongue-like extension of another standard part, the tongue-receiving means commencing from a step in the outer band portion on the side of its ear means opposite the free end of the respective outer band portion and extending away from the corresponding ear means.

41. A stepless clamp structure according to claim 40, wherein the clamp structure is assembled of at least two identical standard parts.

42. A clamp structure according to claim 40, wherein the clamp structure is assembled of standard parts of different length, and wherein still further means in the form of at least one opening in the clamping band means are provided in at least one standard part to compensate for any imbalance.

43. A clamp structure according to claim 42, wherein said opening is located within the area between said one ear means and said step.

* * * * *